(12) United States Patent
Bair

(10) Patent No.: US 7,914,088 B2
(45) Date of Patent: *Mar. 29, 2011

(54) INDIVIDUAL DRIVE LUG FOR AN ENDLESS RUBBER TRACK

(75) Inventor: Larry Bair, Louisburg, KS (US)

(73) Assignee: Bair Products, Inc., Louisburg, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/623,605

(22) Filed: Nov. 23, 2009

(65) Prior Publication Data

US 2010/0096917 A1   Apr. 22, 2010

Related U.S. Application Data

(63) Continuation of application No. 11/494,656, filed on Jul. 28, 2006, now Pat. No. 7,625,050.

(51) Int. Cl.
*B62D 55/12* (2006.01)
*B65G 15/44* (2006.01)

(52) U.S. Cl. .......................................... 305/169; 305/180

(58) Field of Classification Search .................. 305/165, 305/169, 180, 185, 187, 190–191, 193, 195
See application file for complete search history.

(56) References Cited

U.S. PATENT DOCUMENTS

| | | | |
|---|---|---|---|
| 1,786,539 | A | 12/1930 | Kegresse |
| 1,814,046 | A | 7/1931 | Kegresse |
| 3,563,614 | A | 2/1971 | Parks |
| 4,642,080 | A | 2/1987 | Takano et al. |
| 4,687,261 | A | 8/1987 | Atkin |
| 4,758,055 | A | 7/1988 | Anderson |
| 5,641,214 | A | 6/1997 | Kafka |
| 5,707,123 | A | 1/1998 | Grob |
| 6,030,057 | A | 2/2000 | Fikse |
| 6,039,405 | A | 3/2000 | Kurata et al. |
| 6,120,405 | A | 9/2000 | Oertley et al. |
| 6,247,547 | B1 | 6/2001 | Lemke et al. |
| 6,267,453 | B1 | 7/2001 | Deland |
| 6,435,291 | B2 | 8/2002 | Lemke et al. |
| 6,435,292 | B2 | 8/2002 | Lemke et al. |
| 6,517,173 | B1 | 2/2003 | Oberlander et al. |
| 7,625,050 | B2 * | 12/2009 | Bair .............................. 305/169 |

* cited by examiner

*Primary Examiner* — Jason R Bellinger
(74) *Attorney, Agent, or Firm* — Hovey Williams LLP

(57) ABSTRACT

An individual replacement drive or guide lug for missing or worn lugs located on an inner circumference of various endless rubber tracks used on multi-surface vehicles. The lug comprises a body and a fastening including a bolt and washer. To install the drive lug properly, an inner surface of the track where the original vulcanized rubber drive lug was located must be prepared. When the original drive lug fails, it leaves an irregular surface and must be ground flat with the inner track belt substrate. The bolts are then secured through the track and the lug so as to removably secure the lug to the inner surface of the track.

14 Claims, 2 Drawing Sheets

INDIVIDUAL DRIVE LUG FOR AN ENDLESS RUBBER TRACK

RELATED APPLICATIONS

This continuation patent application claims priority benefit, with regard to all common subject matter, of the following earlier-filed U.S. patent application Ser. No. 11/494,656, filed Jul. 28, 2006, now U.S. Pat. No. 7,625,050 issued on Dec. 1, 2009, and entitled "INDIVIDUAL DRIVE LUG FOR AN ENDLESS RUBBER TRACK." The identified earlier-filed patent application is hereby incorporated by reference in its entirety into the present application.

BACKGROUND

1. Field

The present invention relates to endless rubber tracks used on multi-surface vehicles used in various industries. More specifically, the present invention relates to drive or guide lugs that are formed of vulcanized rubber and that are located on an inner circumference of the rubber tracks.

2. Description of the Related Art

Rubber tracks on earth movers or other similar equipment are exposed to harsh environments of sharp rock, sand, ice, snow, and mud for many hours at a time. After 250 to 500 hours of use, the factory-installed tracks start losing portions of their reinforced rubber composition vulcanized drive or guide lugs. These rubber lugs interlock with openings in the equipment drive sprockets to drive the endless rubber track and the applicable equipment. Once deterioration of a lug starts occurring, adjacent drive lugs must compensate for the deteriorated lug and share the drive torque pressure, which causes additional wear on the remaining lugs, until the most worn drive lugs completely break away from the rubber track substrate. Drive lug deterioration will continue until total drive system failure occurs, which means that one or more drive lugs will have to fracture to the point that they are non-functional. It requires four to seven drive lugs to make contact with a drive sprocket of the drive system for proper equipment operation. When total traction failure occurs due to missing drive lugs, the original equipment manufacturers recommend replacing the rubber track with a new track, which is expensive and results in lost operating time. With the present invention, field repair is possible, and the repair is permanent and allows for instant mobility and operation of the equipment.

The present invention allows for replacement of the drive lugs in the field without having to obtain a new track and without having to transport the equipment or the track to a repair center, although the present invention has proven successful for both field and repair center installation. In contrast, prior art original equipment rubber track manufacturers do not recommend replacing missing drive lugs caused by wear in the field. Instead, original equipment manufacturers only recommend replacing the complete rubber track.

SUMMARY

The present invention provides a reliable replacement drive lug for endless rubber track drives. The invention allows for repair and replacement of torn, worn, broken, or missing drive lugs on endless rubber track drives by providing a hard plastic drive lug that can be removably and mechanically secured to a rubber track.

Use of the drive lugs of the present invention extends the life of the track, as the track does not have to be replaced as soon as one or more of the vulcanized rubber lugs deteriorate. Additionally, the lugs can be easily stored in repair tool boxes, the lugs are made of non-corrosive materials, and the durability and lifetime use of the lugs over original equipment manufactured vulcanized rubber lugs is significantly extended. The lugs can be bonded to the track substrate mechanically rather than through a vulcanized procedure, allowing for on-site installation and repair, and upon expiration of the track life, the lugs can be easily removed and reused on a new track.

In sum, the present invention extends the life of the endless rubber track drive rather than replacing it with an expensive new track. The present invention also allows for field repair rather than maintenance shop repair, thus allowing for owner repair of the equipment, rather than dealer repair. It eliminates many hours of downtime and provides for significant cost savings. The present invention has been tested and used on equipment in Kansas and Missouri with outstanding success while exposed to all types of harsh environments.

BRIEF DESCRIPTION OF THE DRAWING FIGURES

Embodiments of the present invention are described in detail below with reference to the attached drawing figures, wherein.

Figure 1:
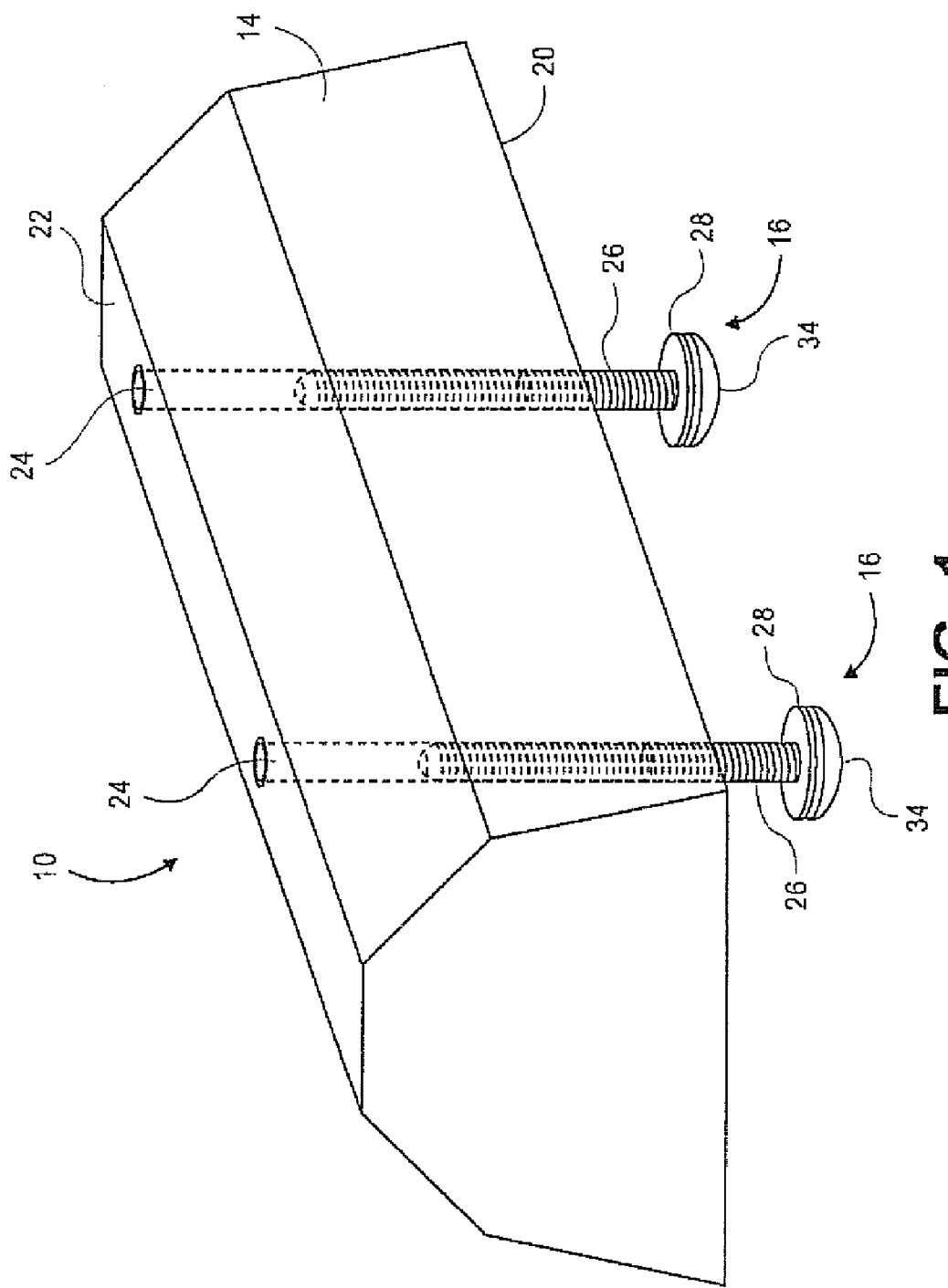
FIG. 1 is a perspective view of a drive lug of embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 2:
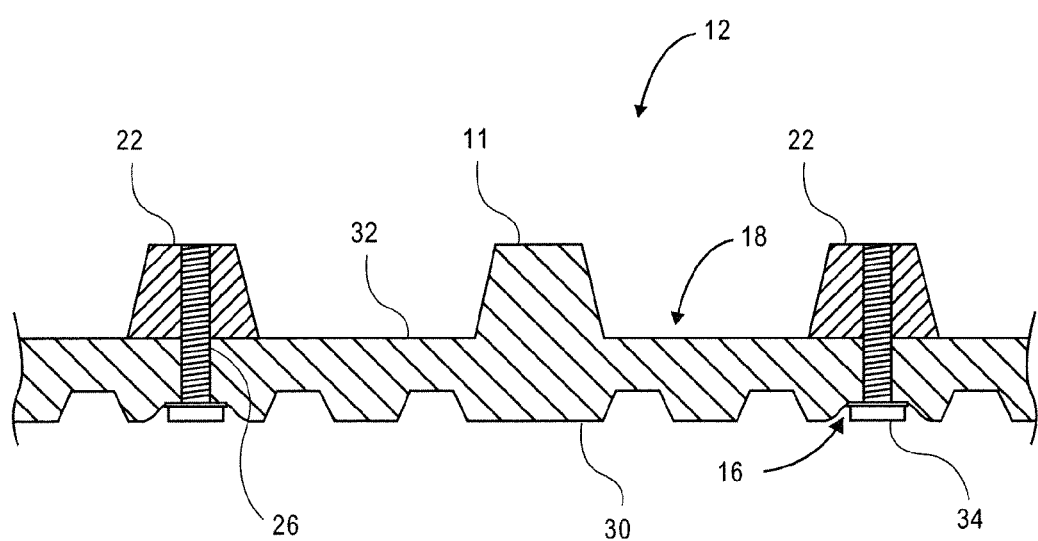
FIG. 2 is a fragmented, vertical, and cross-sectional view of a rubber endless track illustrating the replacement drive lug of the present invention secured to an inner surface of the track and original equipment manufacture drive lugs integral with the inner surface of the track.

Turning now to the drawing figures, and particularly FIGS. 1-2, embodiments of the present invention comprise an individual drive or guide lug 10 for replacement of an original equipment manufacture (OEM) lug 11 of an endless rubber track 12, such as those used on front loaders, earth moving, and agriculture type equipment. The drive lug 10 of embodiments of the present invention comprises a body 14 and a fastening element 16 operable to removably secure the body 14 to the rubber track 12. In embodiments of the present invention, the lug 10 is made of rigid metallic and/or non-metallic material, such as plastic. Preferably, the material strength is equal to or greater than the OEM rubber vulcanized drive lugs 11 located on an inner circumference 18 of the endless rubber track 12 supplied by the original equipment manufacture. The body 14 of the lug 10 has a bottom 20 and a top 22, and the top 22 is of a width less than a width of the bottom 20. The body 14 of the lug 10 receives the fastening element 16, as described below. In embodiments of the present invention, the lug 10 is machined or formed to a size generally corresponding to a size of the OEM lug 11.

The fastening element 16 comprises a bolt 26 and corresponding washer 28 that can be physically separated from the body 14 of the lug 10. The bolt 26 is preferably a full-thread grade 8 bolt configured to be received within the at least one opening of the body 14 of the lug 10. The bolt 26 is of sufficient length to extend through an outer surface 30 of the endless rubber track 12, the bottom 20 of the body 14 of the lug 10, and through a minimum 80% of the body 14 of lug 10. The washer 28 is preferably also grade 8 and is sized to match the grade 8 bolt 26. The washer 28 spreads the torque load to the outer surface 30 of the track 12 when the bolt 26 is tightened and further acts as a retainer to prevent the head of the bolt 26 from pulling through the outer surface 30 of the track 12 when it is tightened.

In operation, the present invention is used to replace missing or worn drive lugs. The lug 10 of embodiments of the present invention can be installed by a user in the field or in a designated repair center, which results in a minimum amount of downtime and a significant cost savings. In addition the drive lug 10 of embodiments of the present invention can be removed from retired endless rubber tracks and installed on active tracks that have missing lugs.

Prior to installation of the lug 10 of embodiments of the present invention, the rubber track 12 substrate must be properly prepared to allow for removable securement of the individual drive lug. When the original drive lug fails, it leaves an irregular surface that must be ground generally flat with an inner surface 32 of the inner circumference 18 of the track substrate. To achieve proper indexing, a template is placed over the outer surface 30 of the track 12 for locating two holes (not shown) for the grade 8 bolts 26. The washer 28 is placed next to a head 34 of the bolt 26, and the bolts 26 are inserted into the holes and through the rubber track 12. The replacement drive lug 10 is then placed over the bolts 26 on the inner surface 32 of the track 12 and opposite the head 34 of the bolts 26. A power impact wrench (not shown) is used to tighten the bolts 26 until the bolt head 34 and washer 28 compresses into the outer surface 30 of the track 12.

Field installation is possible with the present invention, and removal of the track 12 is not necessary. Installation of the lug 10 is best accomplished by cleaning the track substrate in the same location of the missing lug(s). This allows the user to have a method to repair his/her own track rather than ordering a completely new track. This also provides the user with a quick repair method and eliminates the possibility of having excessive downtime when drive lug failure occurs.

After installation there is no need for torque, lubrication, or maintenance of the drive lugs 10. Additionally, the drive lugs 10 of the present invention previously installed on retired tracks are available to be removed and used a second time.

Accordingly, several advantages of the present invention are to provide a quick method to repair existing rubber track drive lugs in a safe and economical manner, to extend existing rubber track life, to eliminate slippage due to worn drive lugs, and to provide individual replacement drive lugs that exceed the life of the original equipment lugs.

The invention claimed is:

1. An endless rubber track for a multi-surface vehicle comprising:
    an outer surface about an outer circumference of the track;
    an inner surface about an inner circumference of the track;
    a plurality of original equipment manufacture drive lugs integral with the inner surface of the track; and
    at least one drive lug mechanically fastened to the track, the mechanically-fastened drive lug including—
        a body having a bottom and a top and sized to be secured to the inner surface of the endless rubber track, and
        a fastening element for securing the body to the inner surface of the track.

2. The endless rubber track as claimed in claim 1, wherein the fastening element comprises a bolt that is physically separated from the body of the mechanically-fastened drive lug.

3. The endless rubber track as claimed in claim 2, wherein the bolt includes a head, and at least part of the head is external to at least one of the body and track when the mechanically-fastened drive lug is fastened to the track.

4. The endless rubber track as claimed in claim 3, wherein the bolt does not extend past the top of the body of the lug when the mechanically-fastened drive lug is fastened to the track.

5. The endless rubber track as claimed in claim 4, wherein the fastening element further comprises a washer operable to prevent the head of the bolt from pulling through the outer surface of the track.

6. The endless rubber track as claimed in claim 1, wherein the body of the mechanically-fastened lug is formed of a non-metallic material and the original equipment manufacture lug is formed of vulcanized rubber.

7. The endless rubber track as claimed in claim 6, wherein the body of the mechanically-fastened lug is formed of plastic.

8. An improvement for an endless rubber track for a multi-surface vehicle, said track having an outer surface about an outer circumference of the track and an inner surface about an inner circumference of the track, said inner surface originally presenting a plurality of original equipment manufacture drive lugs integral with the inner surface of the track, said improvement comprising:
    a plurality of drive lugs mechanically fastened to the track, each mechanically-fastened drive lug including—
        a body having a bottom and a top and sized to be secured to the inner surface of the endless rubber track, and
        a fastening element for securing the body to the inner surface of the track.

9. The improvement of claim 8, wherein the original equipment manufacture drive lugs were originally vulcanized on the inside surface of the rubber track.

10. The improvement of claim 8, wherein the fastening element comprises a bolt that is physically separated from the body of the mechanically-fastened drive lug.

11. The improvement of claim 9, wherein the bolt includes a head, and at least part of the head is external to at least one of the body and track when the mechanically-fastened drive lug is fastened to the track.

12. The improvement of claim 10, wherein the bolt does not extend past the top of the body of the lug when the mechanically-fastened drive lug is fastened to the track.

13. The improvement of claim 11, wherein the fastening element further comprises a washer operable to prevent the head of the bolt from pulling through the outer surface of the track.

14. The improvement of claim 8, wherein the body of the mechanically-fastened lug is formed of plastic.

* * * * *